(12) United States Patent
Sugiura

(10) Patent No.: US 7,819,272 B2
(45) Date of Patent: Oct. 26, 2010

(54) FUEL TANK STRUCTURE

(75) Inventor: Koji Sugiura, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1260 days.

(21) Appl. No.: 11/374,960

(22) Filed: Mar. 15, 2006

(65) Prior Publication Data

US 2006/0207991 A1    Sep. 21, 2006

(30) Foreign Application Priority Data

Mar. 16, 2005    (JP) .............................. 2005-075811

(51) Int. Cl.
*B65D 1/42* (2006.01)
*B65D 6/34* (2006.01)
*B65D 90/02* (2006.01)

(52) U.S. Cl. .................. 220/563; 220/564; 220/653

(58) Field of Classification Search .............. 220/563, 220/564, 501, 653, 651
See application file for complete search history.

(56) References Cited

U.S. PATENT DOCUMENTS

| | | | | |
|---|---|---|---|---|
| 4,399,850 A | * | 8/1983 | Schiemann | 220/653 |
| 4,453,564 A | * | 6/1984 | Bergesio | 137/574 |
| 4,526,286 A | * | 7/1985 | Jung et al. | 220/563 |
| 4,609,106 A | * | 9/1986 | Gentili | 206/509 |
| 6,135,306 A | * | 10/2000 | Clayton et al. | 220/564 |
| 6,293,420 B1 | * | 9/2001 | Richter et al. | 220/563 |
| 6,338,420 B1 | * | 1/2002 | Pachciarz et al. | 220/562 |
| 6,651,764 B2 | * | 11/2003 | Fournier et al. | 180/190 |
| 6,779,678 B2 | * | 8/2004 | Baron | 220/653 |
| 6,843,384 B2 | * | 1/2005 | Schmidt et al. | 220/4.13 |
| 6,857,534 B1 | * | 2/2005 | Keller | 220/4.13 |
| 7,455,190 B2 | * | 11/2008 | Potter et al. | 220/4.14 |
| 2003/0015537 A1 | * | 1/2003 | Konja | 220/563 |

FOREIGN PATENT DOCUMENTS

| | | |
|---|---|---|
| JP | 56-87926 | 12/1979 |
| JP | 63-67328 | 5/1988 |
| JP | 4-066444 | 6/1992 |
| JP | 7-52984 | 12/1995 |
| JP | 2002-536586 | 10/2002 |
| JP | 2004-203199 | 7/2004 |

OTHER PUBLICATIONS

Notice of Reasons for Rejection for JP Appl. No. 2005-075811, dated Mar. 16, 2010.

\* cited by examiner

*Primary Examiner*—Anthony Stashick
*Assistant Examiner*—Niki M Eloshway
(74) *Attorney, Agent, or Firm*—Finnegan, Henderson, Farabow, Garrett & Dunner, LLP

(57) ABSTRACT

The present invention provides a fuel tank structure capable of securely suppressing deformation of a fuel tank by mutual contact of a pair of upper and lower interference sections at the time of deformation of tank by negative pressure. On a peak wall and a bottom wall of the fuel tank, an upper stand-off and a lower stand-off are formed face to face vertically with a certain interval therebetween. The lower stand-off is larger in diameter than the upper stand-off, and includes a general surface for contacting a projecting end of the upper stand-off during application of negative pressure, and an annular rib for preventing dropping of the projecting end. Therefore, at the time of application of negative pressure, deformation of the fuel tank can be securely suppressed.

7 Claims, 7 Drawing Sheets

FUEL TANK STRUCTURE

CROSS-REFERENCE TO RELATED APPLICATION

This application claims priority under 35 USC 119 from Japanese Patent Application No. 2005-075811, the disclosure of which is incorporated by reference herein.

BACKGROUND OF THE INVENTION

1. Field of the Invention

The present invention relates to a fuel tank structure which is made of resin materials, and which has a pair of interference sections for suppressing deformation of a fuel tank at the time of application of negative pressure of a specified value or higher, provided at the upper surface of the tank and the lower surface of the tank.

2. Description of the Related Art

Recently, fuel tanks formed of resin molding are often used mainly from viewpoint of reduction of weight. However, these types of resin-made fuel tanks are generally lower in rigidity as compared with fuel tanks formed of metal materials, and therefore, a technique has been hitherto adopted in which portions called "stand-off" for assuring rigidity or retaining its shape are added at proper positions of the fuel tank.

For example, Japanese Utility Model Application Laid-Open (JP-U) No. 63-67328 discloses a structure of disposing conical trapezoid stand-offs face to face at a specific interval inward in the tank from the upper surface and the lower surface of the fuel tank.

However, in structures disclosed in JP-U No. 63-67328 and Japanese Patent Application Laid-Open (JP-A) No. 2004-203199, if negative pressure is applied to the fuel tank and the fuel tank is deformed, the upper and lower stand-offs may not contact each other as intended (and therefore, the effect of suppressing deformation due to negative pressure may not be expressed sufficiently). More specifically, generally, since the shape of a resin-made fuel tank is complicated, deformation modes of the upper and lower surfaces of the fuel tank due to negative pressure are varied. Hence, deviation may occur in the displacement direction of the upper and lower stand-offs, and depending on the mode of deformation of the upper and lower surfaces of the fuel tank, the upper and lower stand-offs may not contact each other as designed.

These problems may be solved by using a so-called contact type stand-off, such that the bottoms of the upper and lower stand-offs are shared and integrated, or by expanding the areas of the bottoms of the upper and lower stand-offs. However, the volume occupied by the stand-offs is increased, and the capacity of the fuel tank is sacrificed.

SUMMARY OF THE INVENTION

The present invention has been made in the light of the above circumstances and provides a fuel tank structure capable of suppressing deformation of a fuel tank securely, by achieving mutual contact of a pair of upper and lower interference sections at the time of deformation of the tank by negative pressure.

A fuel tank structure in an aspect of the invention is a fuel tank structure made of resin including interference sections for suppressing tank deformation at the time of application of negative pressure of a specified value or higher, the interference sections projecting inward in a fuel tank from an upper surface and a lower surface of the fuel tank, respectively, and being disposed substantially face to face at a specific interval therebetween, wherein the interference sections, as a pair of upper and lower interference sections, have assisting section, which is provided due to at least one element of a structure, a shape and a configuration of the interference sections, for assisting mutual interference of the interference section at the tank upper surface side and the interference section at the tank lower surface side such that the interference section at the tank upper surface side and the interference section at the lower surface side move relative to each other at the time of application of negative pressure, and for maintaining the interference state between the interference section at the tank upper surface side and the interference section at the tank lower surface side while the negative pressure is being applied.

DETAILED DESCRIPTION OF THE INVENTION

First Embodiment

Figure 1A:
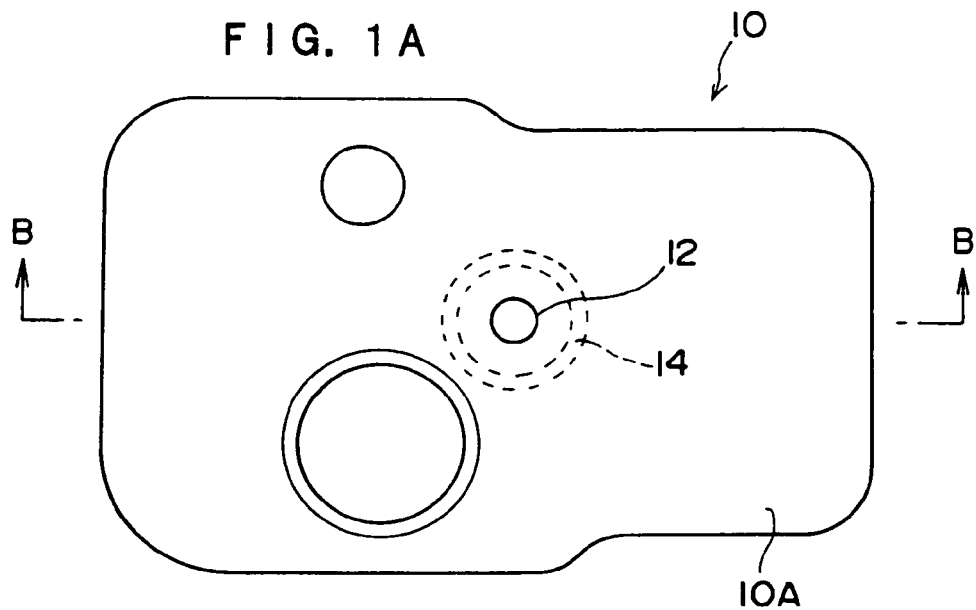
FIG. 1A is a schematic plan view of a fuel tank according to a first embodiment.
Figure 1B:
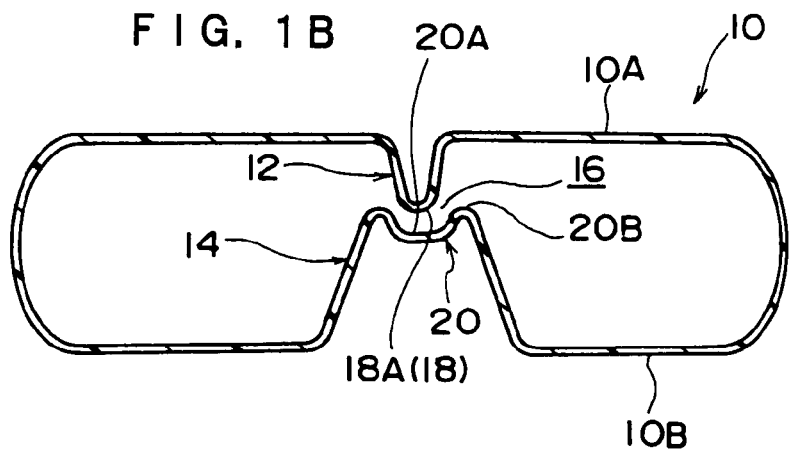
FIG. 1B is a sectional view of line B-B.
Figure 1C:
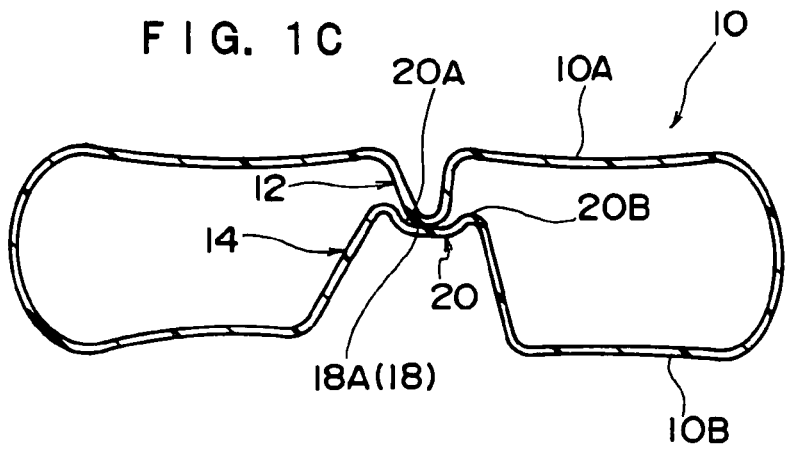
FIG. 1C is a sectional view of a state after deformation corresponding to FIG. 1B.

Referring now to FIGS. 1A-1C, a first embodiment of a fuel tank structure according to the present invention is described below.

FIG. 1A is a schematic plan view of a fuel tank in the present embodiment, and FIG. 1B is a longitudinal sectional view along line B-B of the fuel tank.

As shown in FIG. 1A, a fuel tank 10 has a thin and substantial rectangular parallelepiped shape and is formed of resin materials. The fuel tank 10 is fixed to the lower side of the car body floor by using a long tank band or a buckle not shown. The car body floor includes materials (members) mounted on the car body floor.

As shown in FIG. 1B, nearly at the center of a peak wall 10A as a tank upper surface of the fuel tank 10, an upper stand-off 12 is formed integrally as one interference section projecting inward in the tank (toward a bottom wall 10B) and formed to be nearly conical trapezoid. Similarly, nearly at the center of the bottom wall 10B as a tank lower surface of the fuel tank 10, a lower stand-off 14 is formed integrally as another interference section projecting inward in the tank (toward the peak wall 10A) and formed to be nearly conical trapezoid.

The upper stand-off 12 and the lower stand-off 14 are disposed so as to overlap in plan view (see FIG. 1A). Between the upper stand-off 12 and the lower stand-off 14, a specified gap 16 is provided, and they are disposed face to face vertically in longitudinal sectional view. That is, the upper stand-off 12 and the lower stand-off 14 of the present embodiment are so-called contact-free stand-offs not sharing the bottom.

In the present embodiment, the lower stand-off 14 is set larger in the radial direction than the upper stand-off 12. More specifically, a projecting end 18 of the upper stand-off 12 is disposed concentrically with a projecting end 20 of the lower stand-off 14 in plan view. The projecting end 20 of the lower stand-off 14 is composed of a disk-shaped general surface 20A of larger diameter than the outside diameter of the projecting end 18 of the upper stand-off 12, and a rib 20B as a drop preventive portion annularly raised toward the peak wall 10A side from the outer circumference of the general surface 20A. Therefore, the contact area of the general surface 20A of the projecting end 20 of the lower stand-off 14 is set larger than the contact area of a leading end 18A of the projecting end 18 of the upper stand-off 12. Further, the leading end 18A of the projecting end 18 of the upper stand-off 12 is disposed close to the general surface 20A of the projecting end 20 of the lower stand-off 14, and is disposed slightly to the lower side from the peak of the annular rib 20B.

Operation and effect of the present embodiment are explained below.

The state shown in FIG. 1B is the ordinary state of the resin-made fuel tank 10 according to the present embodiment. In this state, when a negative pressure of a specified value or higher is applied to the fuel tank 10 (herein, the "specified value" means a negative pressure causing (elastic) deformation of the peak wall 10A and the bottom wall 10B of the fuel tank 10), as shown in FIG. 1C, the peak wall 10A and the bottom wall 10B of the fuel tank 10 are deformed by this negative pressure. Along with this deformation, the upper stand-off 12 formed integrally on the peak wall 10A and the lower stand-off 14 formed integrally on the bottom wall 10B move relative to each other (in this embodiment, move relative to each other in the tank vertical direction), and both of them interfere with each other. As a result, deformation of the peak wall 10A and the bottom wall 10B of the fuel tank 10 can be suppressed.

Since the specified gap 16 is provided between the projecting end 18 of the upper stand-off 12 and the projecting end 20 of the lower stand-off 14 (that is, the pair of upper and lower stand-offs 12 and 14 are not of so-called contact type sharing the bottom), the volume occupied by the upper stand-off 12 and the lower stand-off 14 themselves can be decreased. Therefore, the capacity of the fuel tank 10 is sufficiently assured.

In the fuel tank structure of the present embodiment, the pair of upper stand-off 12 and the lower stand-off 14 disposed on the peak wall 10A and the bottom wall 10B of the fuel tank 10, respectively, are set so that the contact area of the projecting end 20 of the lower stand-off 14 (the area of the general surface 20A) may be larger than the contact area of the leading end 18A of the projecting end 18 of the upper stand-off 12. Further, the annular rib 20B is provided at the projecting end 20 of the lower stand-off 14. Therefore, when the peak wall 10A and the bottom wall 10B are deformed due to the application of the negative pressure of the specified value or higher in the fuel tank 10, the leading end 18A of the projecting end 18 of the upper stand-off 12 moves relative to the general surface 20A of the projecting end 20 of the lower stand-off 14 and is assisted so as to mutually interfere therewith. While the negative pressure is being applied, the interference state of the leading end 18A of the projecting end 18 of the upper stand-off 12 and the general surface 20A of the projecting end 20 of the lower stand-off 14 is maintained. Hence, even if the negative pressure applied in the fuel tank 10 is higher, it is possible to prevent interference state cancellation due to deviation after the leading end 18A of the projecting end 18 of the upper stand-off 12 abuts against the general surface 20A of the projecting end 20 of the lower stand-off 14, and mutually interfere (that is, it is possible to prevent increase of deformation amount of the fuel tank 10). As a result, according to the present embodiment, when the tank is deformed by negative pressure, the upper stand-off 12 and the lower stand-off 14 contact each other, and deformation of the fuel tank 10 can be securely suppressed.

In the fuel tank structure of the present embodiment, since the contact area of the projecting end 20 of the lower stand-off 14 (the area of the general surface 20A) is set larger than the contact area of the leading end 18A of the projecting end 18 of the upper stand-off 12, when negative pressure of the specified value or higher is applied, the leading end 18A of the projecting end 18 of the upper stand-off 12 easily contacts (interferes with) the general surface 20A of the projecting end 20 of the lower stand-off 14.

Moreover, since the annular rib 20B is formed at the projecting end 20 of the lower stand-off 14, the leading end 18A of the projecting end 18 of the upper stand-off 12 which has abutted against the general surface 20A can be prevented from dropping out of the general surface 20A by sliding on the general surface 20A. Therefore, even if the negative pressure applied in the fuel tank 10 is increased, the interference state of the projecting end 18 of the upper stand-off 12 with the projecting end 20 of the lower stand-off 14 is favorably maintained.

Owing to the two reasons discussed above, according to the present embodiment, the reliability of deformation suppressing effect of the fuel tank 10 can be enhanced.

In the present embodiment, the upper stand-off 12 is formed on the peak wall 10A of the fuel tank 10, and the lower stand-off 14 is formed on the bottom wall 10B, but not limited to this relation, the upper and lower stand-offs 12 and 14 may be formed in reverse relation.

Second Embodiment

Figure 2A:
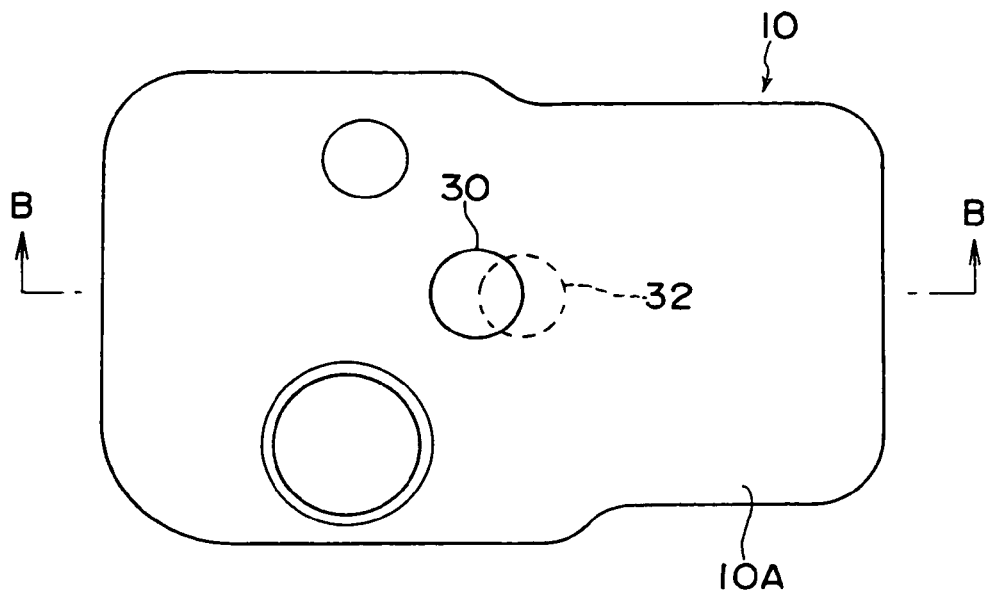
FIG. 2A is a schematic plan view of a fuel tank according to a second embodiment.
Figure 2B:
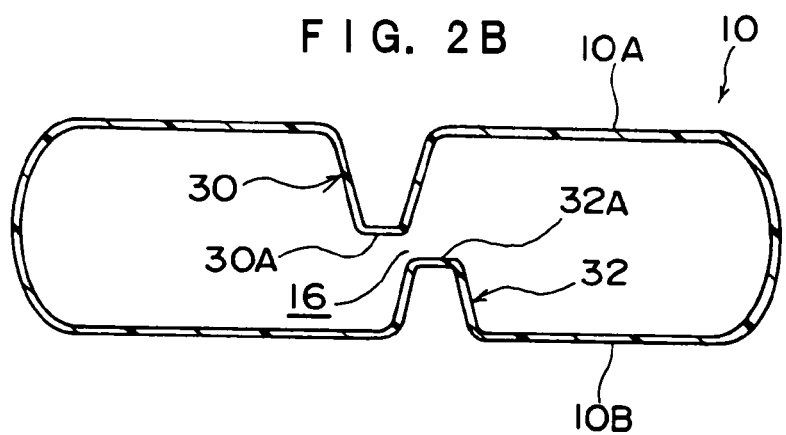
FIG. 2B is a sectional view of line B-B.
Figure 2C:
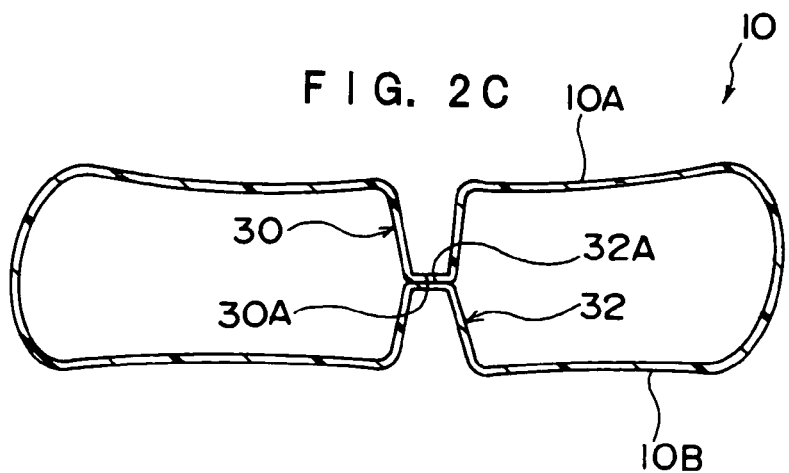
FIG. 2C is a sectional view of a state after deformation corresponding to FIG. 2B.

Referring now to FIGS. 2A-2C, a second embodiment of a fuel tank structure according to the present invention is described below. The same parts as in the first embodiment are identified with the same reference numerals, and explanation thereof is omitted.

As shown in FIGS. 2A and 2B, the second embodiment is characterized by an upper stand-off 30 and a lower stand-off 32 of similar shape which are formed from the peak wall 10A and the bottom wall 10B of the fuel tank 10, respectively, and the upper stand-off 30 is deviated (offset) from the lower stand-off 32 by a specified distance in plan view.

According to this structure, when a negative pressure of a specified value or higher is applied in the fuel tank 10, as shown in FIG. 2C, the upper stand-off 30 and the lower stand-off 32 relatively move in the mutually approaching direction, and abutting faces 30A and 32A thereof confront each other. In other words, in this embodiment, direction and extent of deformation of the peak wall 10A and the bottom wall 10B, when a negative pressure of a specified value or higher is applied in the fuel tank 10, are preliminarily obtained by experiment and the like, and predicted values are obtained, and the relative moving direction and relative moving extent of the upper stand-off 30 and the lower stand-off 32 can be expected. In consideration of these expected values, a deviation amount of the upper stand-off 30 and the lower stand-off 32 in plan view is determined, so that the upper stand-off 30 and the lower stand-off 32 can contact each other effectively.

Therefore, if deviation direction and deviation extent of the peak wall 10A and the bottom wall 10B of the fuel tank 10 are the same as predicted, the abutting faces 30A and 32A of the upper stand-off 30 and the lower stand-off 32 can contact each other securely. As a result, the embodiment can enhance the reliability of deformation suppressing effect of the fuel tank 10.

The second embodiment is characterized by positional relationship of a pair of the upper stand-off 30 and lower stand-off 32, and no change is needed in the shape and structure of the stand-offs. Therefore, the design thereof is relatively easy, and forming thereof is also easy. Hence, it is advantageous in terms of cost.

Third Embodiment

Figure 3A:
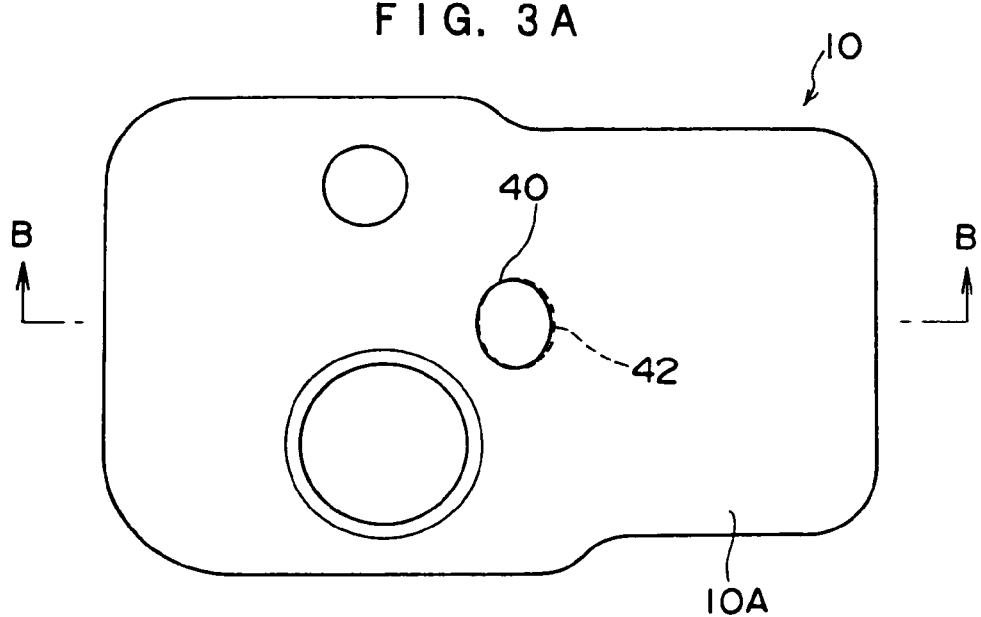
FIG. 3A is a schematic plan view of a fuel tank according to a third embodiment.
Figure 3B:
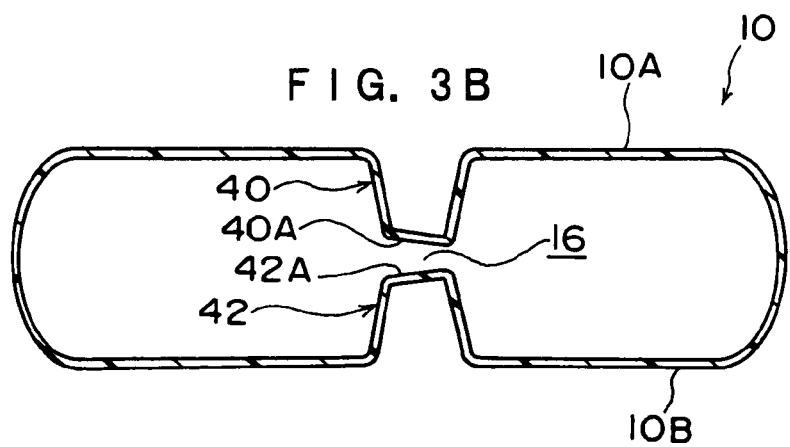
FIG. 3B is a sectional view of line B-B.
Figure 3C:
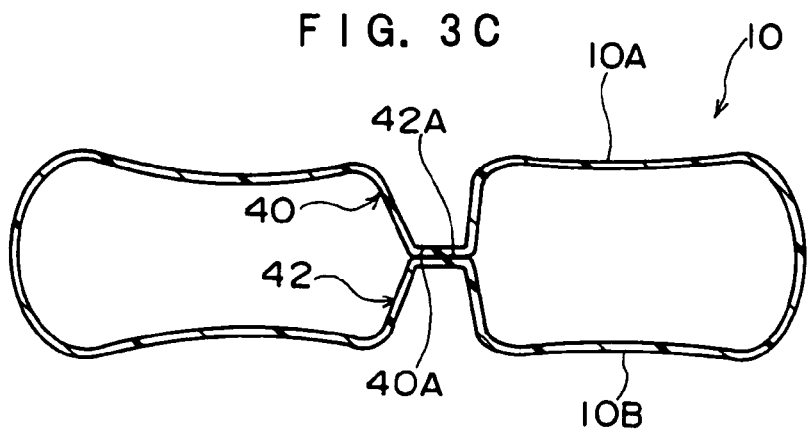
FIG. 3C is a sectional view of a state after deformation corresponding to FIG. 3B.

Referring now to FIGS. 3A-3C, a third embodiment of a fuel tank structure according to the present invention is described below. The same parts as in the first embodiment are identified with the same reference numerals, and explanation thereof is omitted.

As shown in FIGS. 3A and 3B, in the third embodiment, an upper stand-off 40 and a lower stand-off 42 of similar shape are formed from the peak wall 10A and the bottom wall 10B of the fuel tank 10, and an abutting face 40A of the upper stand-off 40 and an abutting face 42A of the lower stand-off 42 are formed by the slopes of specified angles not parallel to each other.

According to this structure, when negative pressure is not applied in the fuel tank 10, as shown in FIG. 3B, the abutting face 40A of the upper stand-off 40 and the abutting face 42A of the lower stand-off 42 are formed in planes not parallel to each other. In this state, as shown in FIG. 3C, when a negative pressure of a specified value or higher is applied in the fuel tank 10, and the peak wall 10A and the bottom wall 10B of the fuel tank 10 are deformed, as a result of using the deformation, the abutting face 40A of the upper stand-off 40 and the abutting face 20A of the lower stand-off 42 become nearly parallel to each other and contact mutually. When deformation direction and deformation extent of the peak wall 10A and the bottom wall 10B of the fuel tank 10 in the event of application of negative pressure are preliminarily obtained by experiment and the like, the inclination angles of the abutting faces 40A and 42A of the upper stand-off 40 and the lower stand-off 42 can be calculated to conform to the values that have been obtained by experiment and the like, and they are disposed to be not parallel to each other, so that the abutting face 40A of the upper stand-off 40 and the abutting face 42A of the lower stand-off 42 can contact each other securely in the event of application of negative pressure of a specified value or higher.

Therefore, when the deformation direction and deformation extent of the fuel tank 10 are the same as predicted, the abutting face 40A of the upper stand-off 40 and the abutting face 42A of the lower stand-off 42 can contact each other securely. As a result, the embodiment can enhance the reliability of deformation suppressing effect of the fuel tank 10.

Fourth Embodiment

Referring now to FIG. 4A to FIG. 7, a fourth embodiment of a fuel tank structure according to the invention is described below. The same parts as in the first embodiment are identified with the same reference numerals, and explanation thereof is omitted.

Figure 4A:
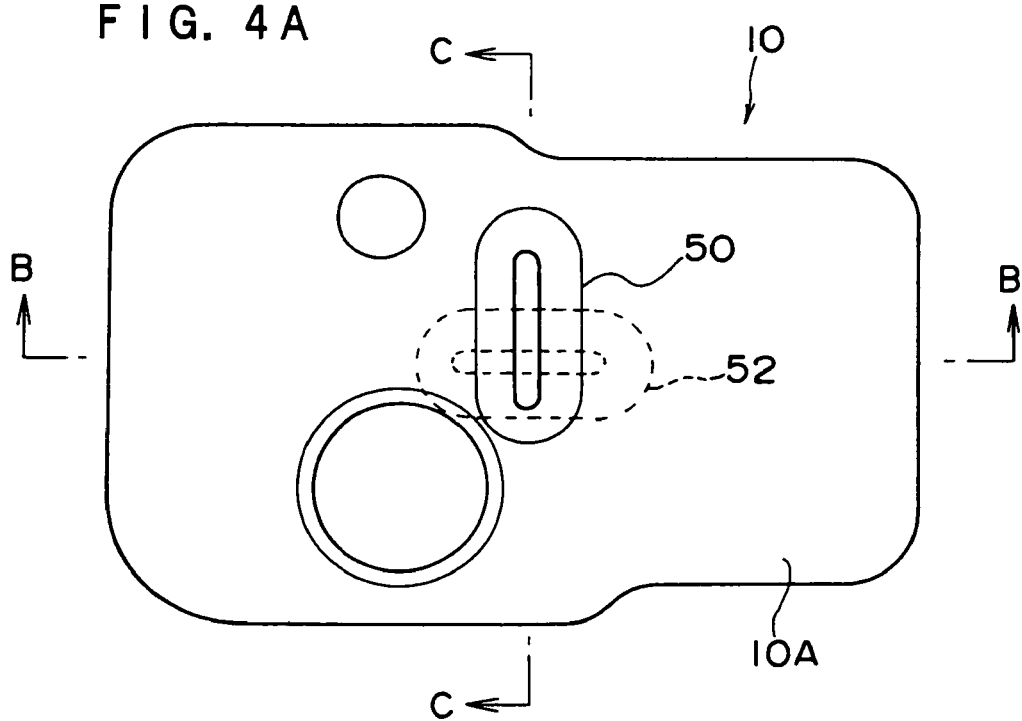
FIG. 4A is a schematic plan view of a fuel tank according to a fourth embodiment.
Figure 4B:
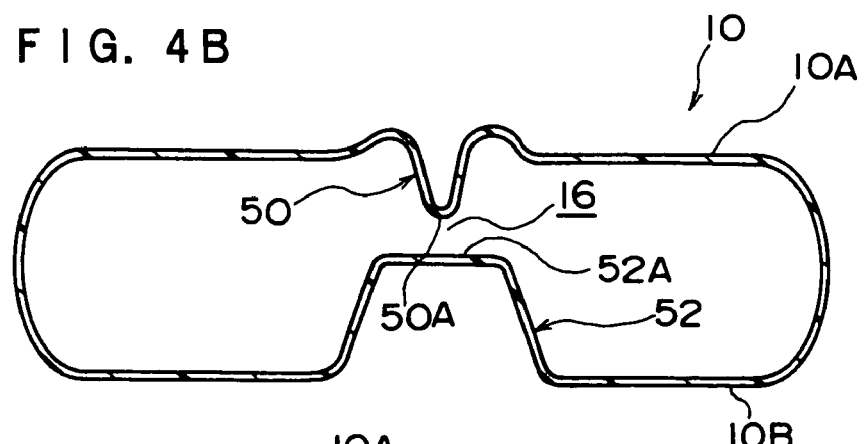
FIG. 4B is a sectional view of line B-B.
Figure 4C:
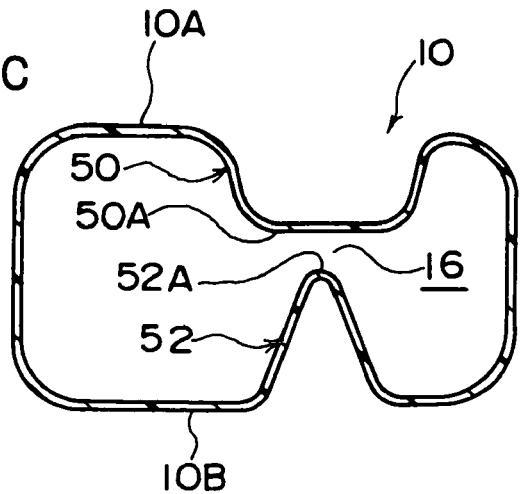
FIG. 4C is a sectional view of line C-C.
Figure 6:
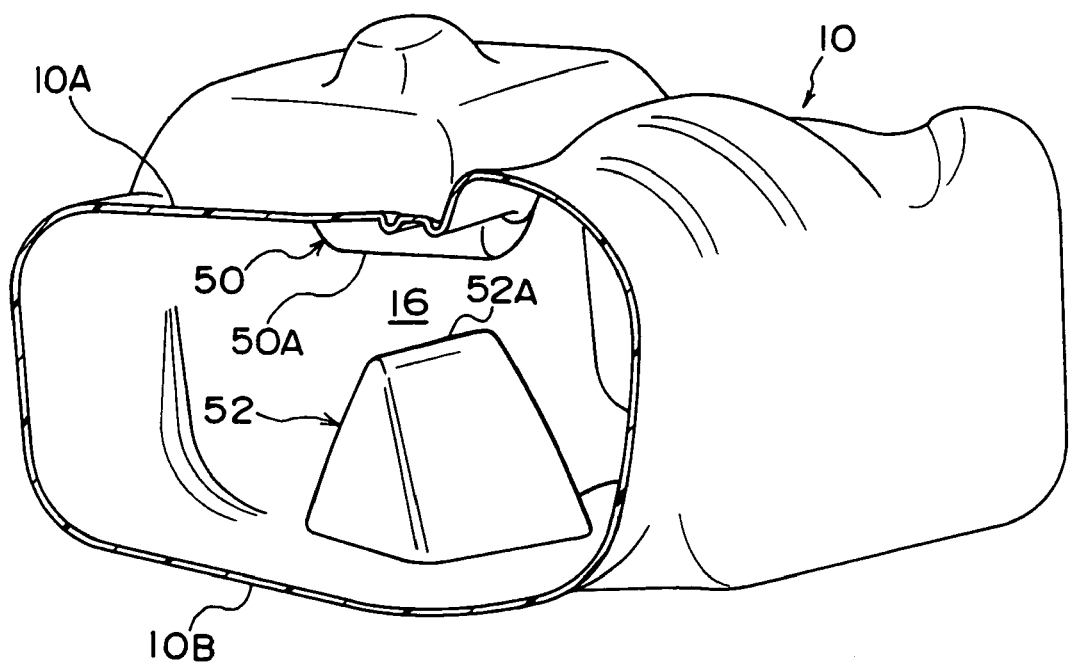
FIG. 6 is a perspective view showing a relevant part (+ type) of a fuel tank structure according to the fourth embodiment.

FIG. 4A is a schematic plan view of a fuel tank in this embodiment, FIG. 4B is a sectional view of line B-B, and FIG. 4C is a sectional view of line C-C. FIG. 6 is a perspective view showing a relevant part of a fuel tank structure in the present embodiment.

As shown in these drawings, the fourth embodiment is characterized by formation and disposition of an upper baffle 50 and a lower baffle 52 of similar shape from the peak wall 10A and the bottom wall 10B of the fuel tank 10 so as to be in +configuration (a plus-shaped configuration) in plan view.

More specifically, the upper baffle 50 and the lower baffle 52 are formed in a blade shape of a substantially V-section in longitudinal view along a direction orthogonal to be longitudinal direction, in a substantially trapezoidal shape in longitudinal section along the longitudinal direction, and they are initially intended to suppress the flowing noise of fuel contained in the fuel tank 10. In the embodiment, the upper baffle 50 and lower baffle 52 are formed in a + configuration in plan view, and a specified interval 16 is provided between the both leading ends 50A and 52A.

Operation and effect of the embodiment are described below.

Figure 5A:
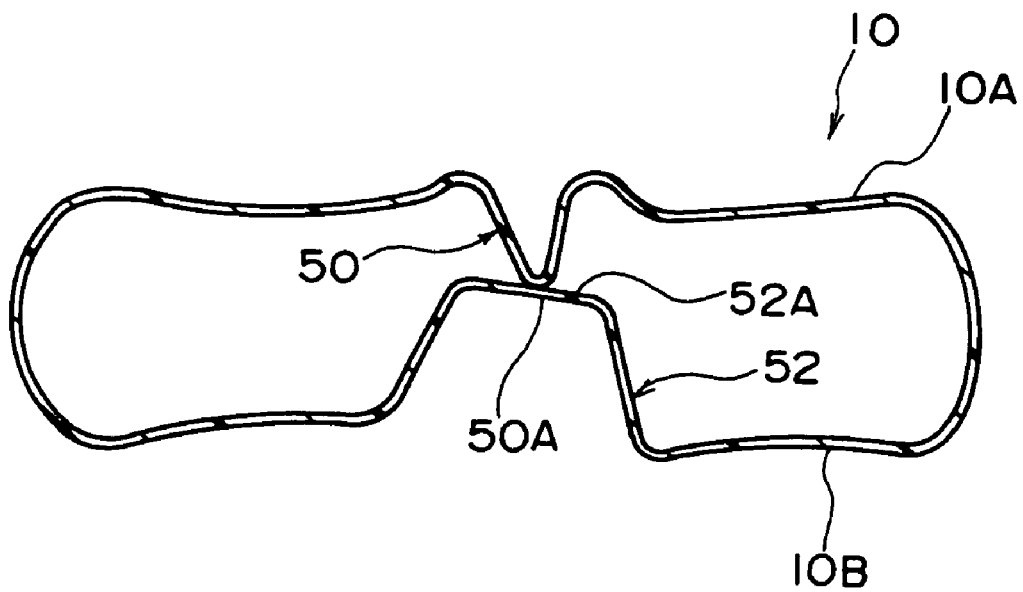
FIG. 5A is a sectional view of a state after deformation corresponding to FIG. 4B.
Figure 5B:
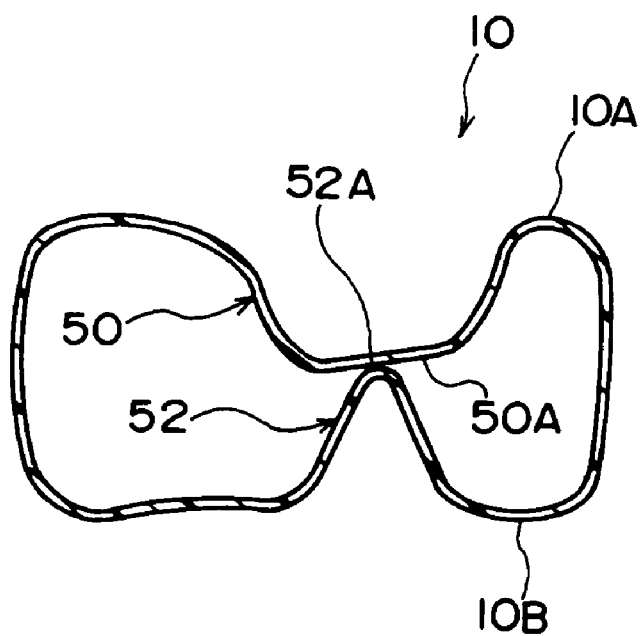
FIG. 5B is a sectional view of a state after deformation corresponding to FIG. 4C.

The state shown in FIG. 4A to FIG. 4C is the ordinary state of fuel tank 10 in this embodiment. In this state, when a negative pressure of a specified value or higher is applied in the fuel tank 10, as shown in FIGS. 5A and 5B, the peak wall 10A and the bottom wall 10B of the fuel tank 10 are deformed by the negative pressure. By this deformation, the upper baffle 50 formed integrally on the peak wall 10A and the lower baffle 52 formed integrally on the bottom wall 10B are moved relative to each other, and the both leading ends 50A and 52A interfere with (contact) each other (in a point contact state). As a result, deformation of the peak wall 10A and the bottom wall 10B of the fuel tank 10 can be suppressed.

In the fuel tank structure of the embodiment, by disposing the upper baffle 50 and lower baffle 52 of blade shape in + configuration in plan view, they act to suppress deformation of fuel tank 10, and by sacrificing the capacity of fuel tank 10 only very slightly, the upper baffle 50 and lower baffle 52 effectively contact with each other to maintain the state when a negative pressure of a specified value or higher is applied. In this baffle structure, within the range of side length of leading end 50A of upper baffle 50 and leading end 52A of lower baffle 52 mutually contacting and interfering with each other, one of the leading ends 50A, 52A is not dislocated from the other. Hence, the embodiment enhances the deformation suppressing effect of the fuel tank 10.

In the fuel tank structure of the embodiment, the upper baffle 50 and lower baffle 52 express the deformation suppressing function of fuel tank 10, and moreover while the baffles are used for suppressing deformation of fuel tank 10, the original function of suppressing the noise of flow can be also expected. In this case, single components can be used for multiple purposes, and the internal structure of the fuel tank 10 is simplified as compared with the structure of using individual elements for individual functions, and hence manufacture can be simplified.

In the fuel tank structure of the embodiment, since baffles are used as interference sections, decrease of capacity of fuel tank 10 can be limited to a minimum. As a result, the capacity of fuel tank 10 can be increased.

Figure 7:
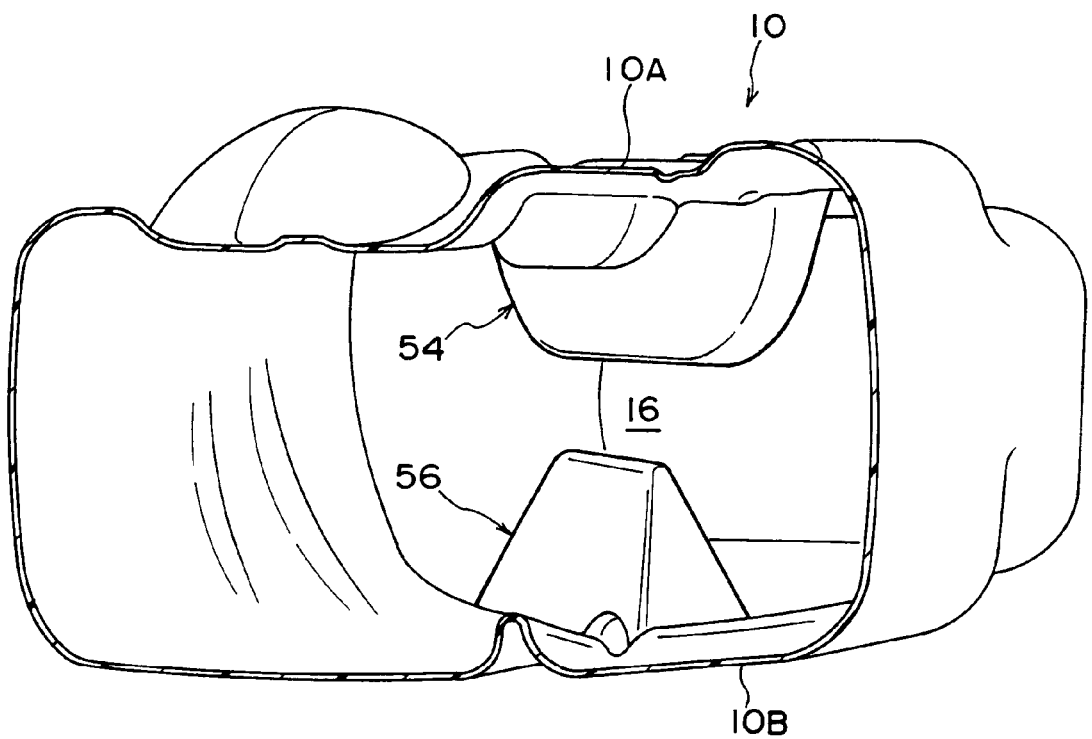
FIG. 7 is a perspective view showing a relevant part (x type) of a fuel tank structure according to the fourth embodiment.

In the embodiment, the upper baffle 50 and lower baffle 52 are disposed in +configuration in plan view, but not limited to this configuration, they may be disposed to intersect in plan view. Therefore, as shown in FIG. 7, the upper baffle 54 and lower baffle 56 may be disposed in x configuration in plan view. In this configuration, too, the same effect and action as in the embodiment shown in FIG. 6 can be obtained.

In the embodiment, the upper baffle 50 (or upper baffle 54) and lower baffle 52 (or lower baffle 56) are disposed on the peak wall 10A and bottom wall 10B of fuel tank 10, but either one may be baffle structure and other may be stand-off structure, and they ma be combined.

In the embodiment, the leading ends 50A, 54A of the upper baffles 50, 54, and the leading ends 52A, 56A of the lower baffles 52, 56 are round (curved), but they may be also formed in flat narrow shape. The leading ends 50A, 54A of the upper baffles 50, 54, and the leading ends 52A, 56A of the lower baffles 52, 56 are not required to be straight, but may be formed, for example, like a figure of letter B, or in a stepped shape.

Supplementary Explanations of Embodiments

In order to provide a supplementary explanations of the "assisting section (assisting means)" of the present invention, in the first embodiment, configuration of the assisting section is attributable mainly to two elements of a shape and a structure of the upper stand-off 12 and the lower stand-off 14 functioning as interference sections. In the second embodiment, configuration of the assisting section is attributable mainly to one element of a disposition of the upper stand-off 30 and the lower stand-off 32 functioning as interference sections. In the third embodiment, configuration of the assisting section is attributable mainly to two elements of a shape and a structure of upper stand-off 40 and the lower stand-off 42 functioning as interference sections. In the fourth embodiment, configuration of the assisting section is attributable mainly to one element of a disposition of the upper baffles 50 and 54 and lower baffles 52 and 56 functioning as interference sections. However, elements not mentioned as main elements in the first to fourth embodiments are also necessary elements. What is meant in the embodiments is that the effects depend on such main elements, which are called assisting sections.

In the fuel tank structure according to the present invention, in the assisting section, a contact area of a projecting end of another of the interference sections is set larger than a contact area of a projecting end of one of the interference sections, and the assisting section is configured by having, at the projecting end of the other interference section, a general surface disposed for contacting the projecting end of the one interference section, and a drop preventive portion for preventing the projecting end of the one interference section in contact with the general surface from dropping out of the general surface.

In the fuel tank structure according to the present invention, the assisting section is structured by disposing one interference section and other interference section by deviating by a specified distance in plan view.

In the fuel tank structure according to the present invention, the assisting section is composed by setting the abutting face at the projecting end of one interference section and the abutting face at the projecting end of another interference section in planes not parallel to each other, and by making use of tank deformation by application of negative pressure, so that the abutting face at the projecting end of the one interference section and the abutting face at the projecting end of the other interference section become nearly parallel to each other, and hence contact each other.

In the fuel tank structure according to the present invention, the assisting section is composed by using a baffle type interference section at least for one of the one interference section and the other interference section.

In the fuel tank structure according to the present invention, both of the one interference section and the other interference section are formed of a baffle type interference section, and the upper and lower baffle type interference sections intersect each other in plan view.

According to the invention, when a negative pressure of a specified value or higher is applied in the fuel tank, the fuel tank is deformed by the negative pressure. From the upper surface and the lower surface of the fuel tank, a pair of upper and lower interference sections are disposed face to face across a specified interval by projecting inward in the tank, and deformation of the fuel tank can be suppressed by relative movement and mutual interference of the upper and lower interference sections.

As mentioned above, since a specified interval is provided between the pair of upper and lower interference sections (that is, the structure is not of contact type of sharing the bottom by the interference sections provided at the upper surface and the lower surface of the fuel tank), the volume occupied by the interference sections provided at the upper surface and the lower surface of the fuel tank can be decreased, and the capacity of the fuel tank is assured.

In the present invention, the pair of upper and lower interference sections have an assisting section making use of any one element of a structure, a shape and a disposition. At the time of application of negative pressure of a specified value or higher, the interference section at the tank upper surface and the interference section at the tank lower surface are assisted to move relative to each other and interfere with each other. During application of negative pressure, the interference state of interference section at the tank upper surface and the interference section at the tank lower surface is maintained. Therefore, even if the negative pressure applied in the fuel tank is high, cancellation of interference state (that is, increase of deformation amount of the fuel tank) due to further deviation after mutual interference of the upper and lower interference sections can be prevented.

According to the present invention, since the contact area of the projecting end of the other interference section is set larger than the contact area of the projecting end of the one interference section. Therefore, when negative pressure larger than a specified value is applied in the tank, the projecting end of the one interference section easily contacts (interferes with) the general surface for abutment provided at the projecting end of the other interference section.

Moreover, the projecting end of the other interference section has a drop preventive portion for preventing the projecting end of the one interference section in contact with the general surface from dropping out of the general surface (due to sliding or the like). Therefore, even if a large negative pressure is applied in the fuel tank, the interference state of projecting end of the one interference section and the projecting end of the other interference section can be maintained.

In the present invention, the assisting section is formed only by deviating the disposition of one interference section and other interference section by a specified distance in plan view, and if the disposition position of one interference section and other interference section is deformed in a direction of coinciding in plan view by action of negative pressure larger than specified value in the fuel tank, the upper and lower interference sections contact with each other. In other words, in the present invention, when a negative pressure of a specified value or higher is applied in the fuel tank, direction and extent of deformation of the tank upper surface and the tank lower surface are preliminarily obtained by experiment, and predicted values are obtained, and the relative moving direction and relative moving extent of the upper and lower interference sections can be expected, and in consideration of these expected values, deviation of the upper and lower interference sections in plan view is determined, so that the upper and lower interference sections can contact with each other effectively.

According to the invention, when negative pressure is not acting in the fuel tank, the abutting face at the projecting end of one interference section and abutting face at the projecting end of other interference section are formed in planes not parallel to each other. In this state, when a negative pressure of a specified value or higher is applied in the fuel tank and the fuel tank deforms, by this deformation (that is, as a result of deformation), the abutting face at the projecting end of one interference section and abutting face at the projecting end of other interference section become nearly parallel to each other and contact mutually. When deformation direction and deformation extent of fuel tank in the event of action of negative pressure are preliminarily obtained by experiment, the inclination angles of abutting faces of upper and lower interference sections can be calculated to conform to the values obtained by experiment, so that the upper and lower interference sections can securely contact with each other securely in the event of application of negative pressure of a specified value or higher.

In the present invention, a baffle is used at least in one of the two interference sections, and the capacity of fuel tank is sacrificed only very slightly, and the upper and lower interference sections effectively contact with each other, and this state can be maintained.

In the present invention, baffles are used in both interference sections, and the interference sections of both baffles intersect in plan view, and if negative pressure of a specified value or higher is applied in the fuel tank, the leading ends of interference sections of upper and lower baffles interfere with each other, and deformation of the fuel tank is suppressed.

As described herein, in the fuel tank structure according to the present invention, the pair of upper and lower interference sections have an assisting section making use of any one element of a structure, a shape and a disposition, and by application of negative pressure of a specified value or higher, the interference section at the tank upper surface and the interference section at the tank lower surface are assisted to move relative to and interfere with each other, and during application of negative pressure, the interference state of the interference section at the tank upper surface and the interference section at the tank lower surface is maintained, and it hence prevents cancellation of interference state due to further deviation after mutual interference of the upper and lower interference sections, and as a result, it is effective to securely suppress deformation of the fuel tank by mutual abutment of the pair of upper and lower interference sections at the time of tank deformation by negative pressure.

In the fuel tank structure according to the present invention, in the assisting section, a contact area of a projecting end of another of the interference sections is set larger than a contact area of a projecting end of one of the interference sections, and the assisting section is configured by having, at the projecting end of the other interference section, a general surface disposed for contacting the projecting end of the one interference section, and a drop preventive portion for preventing the projecting end of the one interference section in contact with the general surface from dropping out of the general surface. Hence, the projecting end of the one interference section can be prevented from dropping out of the general surface for abutment of the projecting end of the other interference section, so that advantageous effect is provided that the reliability of deformation suppressing effect of a fuel tank is enhanced.

In the fuel tank structure according to the present invention, the assisting section is composed by disposing the one interference section and the other interference section by deviating by a specified distance in plan view. Therefore, when the deformation direction and the deformation amount of the fuel tank are same as predicted, the upper and lower interference sections securely contact each other, and the reliability of deformation suppressing effect of a fuel tank is enhanced.

In the present invention, no change is necessary in the shape and structure of the pair of upper and lower interference sections, and therefore, design is relatively easy, and forming is also easy.

In the fuel tank structure according to the present invention, the assisting section is composed of the contact area of projecting end of one interference section and the contact area of projecting end of other interference section formed in planes not parallel to each other, so that the projecting end of one interference section and the projecting end of other interference section may be nearly parallel to each other and contact with each other as a result of deformation of tank by action of negative pressure larger than specified, and therefore when the deformation direction and deformation amount of fuel tank are same as predicted, the upper and lower interference sections contact with each other securely, and the reliability of deformation suppressing effect of fuel tank is enhanced.

In the fuel tank structure according to the present invention, the assisting section is composed by forming a baffle at least in one of the two interference sections, and the capacity of fuel tank is sacrificed only very slightly, and the upper and lower interference sections effectively contact with each other, and this state can be maintained, and hence the reliability of deformation suppressing effect of fuel tank is enhanced.

In the present invention, as for the interference section using a baffle, degree of capacity decrease of a fuel tank is smaller. As a result, the capacity of a fuel tank can be increased.

In the fuel tank structure according to the present invention, both of the one interference section and the other interference section are formed of a baffle type interference section, and upper and lower baffle type interference sections intersect each other in plan view. Therefore, advantageous effect is provided that the reliability of deformation suppressing effect of a fuel tank can be enhanced, and in addition, the decrease of capacity of a fuel tank can be kept to a minimum level.

What is claimed is:

1. A fuel tank structure made of resin, comprising:
interference sections for suppressing tank deformation caused by a negative pressure of a specified value or higher, the interference sections projecting inward in a fuel tank from an upper surface and a lower surface of the fuel tank, respectively, and substantially opposed with a specified interval therebetween,
wherein the interference sections include an upper interference section defined by the upper surface and a lower interference section defined by the lower surface, and have an assisting section, which is provided based on at least one of structure, shape and configuration of the interference sections, for assisting mutual contact of the upper interference section and the lower interference section such that the upper interference section and the lower interference section move relative to each other in a displacement direction due to the negative pressure, and for maintaining contact between a projecting end of the upper interference section and a projecting end of the lower interference section even if the negative pressure causes at least one of the interference sections to deviate from the displacement direction; and wherein the assisting section is defined by at least one of the upper interference section and the lower interference section defining a baffle including first and second generally planar walls extending inwardly in the fuel tank and sloping toward one another.

2. The fuel tank structure of claim 1, wherein each of the upper interference section and the lower interference section define a respective baffle, and the baffle of the upper interference section and the baffle of the lower interference section intersect each other in plan view.

3. The fuel tank structure of claim 1, wherein the baffle has a blade shape, and a vertical sectional shape along a longitudinal direction of the baffle is a substantial trapezoid, and a vertical sectional shape along a direction orthogonal to the longitudinal direction is a substantial V-shape.

4. The fuel tank structure of claim 3, wherein a vertical sectional shape of a leading end of the baffle, along a direction orthogonal to the longitudinal direction, is any one of a curved surface shape, flat surface shape, laterally-facing letter B shape, and stair shape.

5. The fuel tank structure of claim 1, wherein the baffle includes a flow noise suppressing portion configured to suppress noise of fuel contained in the fuel tank.

6. A fuel tank structure made of resin, comprising:

interference sections for suppressing tank deformation at a time of application of pressure of a specified value or higher, the interference sections projecting inward in a fuel tank from an upper surface and a lower surface of the fuel tank, respectively, and being disposed so as to be substantially opposed with a specified interval therebetween, wherein, the interference sections, as a pair of upper and lower interference sections, have an assisting section, which is provided based on at least one of structure, shape and configuration of the interference sections, for assisting mutual interference of the interference section at the tank upper surface side and the interference section at the tank lower surface side such that the interference section at the tank upper surface side and the interference section at the lower surface side move relative to each other at the time of application of negative pressure, and for maintaining an interference state between the interference section at the tank upper surface side and the interference section at the tank lower surface side while the negative pressure is being applied;

the assisting section includes a contact area of a projecting end of one of the interference sections, which is set larger than a contact area of a projecting end of the other interference sections;

the assisting section is configured by having, at the projecting end of the other interference section, a general surface disposed for contacting the projecting end of the one interference section, and a drop preventive portion for preventing the projecting end of the one interference section in contact with the general surface from dropping out of the general surface;

the drop preventive portion includes a rib raised from the general surface toward the inside of the tank; and a leading end of the projecting end of the one interference section is disposed close to the general surface, and is disposed at a lower side from a peak of the rib by a specified amount.

7. A fuel tank structure made of resin, comprising:

a pair of interference sections for suppressing tank deformation at a time of application of negative pressure of a specified value or higher, the pair of interference sections projecting inward in a fuel tank from an upper surface and a lower surface of the fuel tank, respectively, and being disposed so as to be substantially opposed with a specified interval therebetween, thereby allowing the interference section at the tank upper surface side and the interference section at the tank lower surface side to contact each other; and an assisting section, which is provided at the pair of interference sections based on at least one of structure, shape and configuration of the pair of the interference sections, for assisting mutual interference of the interference section at the tank upper surface side and the interference section at the tank lower surface side such that the interference section at the tank upper surface side and the interference section at the lower surface side move relative to each other at the time of application of negative pressure, and for maintaining an interference state between the interference section at the tank upper surface side and the interference section at the tank lower surface side while the negative pressure is being applied;

wherein the assisting section includes:

a projecting end of one of the interference sections having a contact area set smaller than a contact area of a projecting end of the other interference section;

a general surface disposed at the projecting end of the other interference section for contacting the projecting end of the one interference section; and a drop preventive portion disposed at the projecting end of the other interference section for preventing the projecting end of the one interference section in contact with the general surface from dropping out of the general surface;

wherein the drop preventive portion includes a rib raised from the general surface toward the inside of the tank; and wherein a leading end of the projecting end of the one interference section is disposed close to the general surface, and is disposed at a lower side from a peak of the rib by a specified amount.

* * * * *